(12) United States Patent
Grosskrueger

(10) Patent No.: US 6,758,743 B1
(45) Date of Patent: Jul. 6, 2004

(54) VENTING SYSTEM FOR USE WITH COMPOSITE STRUCTURES

(75) Inventor: Duane D. Grosskrueger, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/144,334

(22) Filed: May 13, 2002

(51) Int. Cl.$^7$ ................................................ E04B 1/70
(52) U.S. Cl. ...................... 454/185; 454/70; 52/302.1; 52/302.3
(58) Field of Search ........................ 454/70, 71, 185, 454/255; 52/302.1, 302.3

(56) References Cited

U.S. PATENT DOCUMENTS

| | | | | |
|---|---|---|---|---|
| 4,175,480 A | * | 11/1979 | Beam et al. | ................. 454/278 |
| 4,534,119 A | * | 8/1985 | Glicksman | ..................... 34/95 |
| 5,359,850 A | | 11/1994 | Prescott | ...................... 60/271 |
| 5,477,651 A | * | 12/1995 | Fitzgibbon | ................. 52/302.1 |
| 5,667,611 A | | 9/1997 | Sassa | ......................... 156/148 |

* cited by examiner

Primary Examiner—Gregory Wilson
(74) Attorney, Agent, or Firm—Marsh Fischmann & Breyfogle LLP

(57) ABSTRACT

The present invention relates to a system for venting interior cores of composite structures. Generally, the venting system includes a mounting assembly and a venting medium. The mounting assembly generally interconnects the venting system to the composite structure generally with respect to a first air hole of the composite structure. The venting medium may have a perimeter region and an airflow region disposed inwardly of the perimeter region. In one aspect, this airflow region of the venting medium may be free from direct contact with any other portion of the venting system. In another aspect, the venting medium may be made of a fluorocarbon polymer/copolymer. Upon implementation of the present invention, airflow that is generally directed through the first air hole and that passes between the core of the composite structure and an exterior environment (e.g., a payload compartment) generally passes through the venting medium of the venting system.

38 Claims, 4 Drawing Sheets

VENTING SYSTEM FOR USE WITH COMPOSITE STRUCTURES

STATEMENTS REGARDING FEDERALLY SPONSORED RESEARCH OR DEVELOPMENT

Not applicable.

FIELD OF THE INVENTION

The present invention generally relates to composite structures, and more particularly, to a venting system for venting and/or filtering airflow entering/exiting at least a portion of a composite structure.

BACKGROUND OF THE INVENTION

Composite materials (such as those utilized in aircrafts, spacecrafts, watercrafts, and the like) are generally made up of a pair of outer face sheets and an inner core area. The outer face sheets can be made from a variety of materials such as, but not limited to, metals, carbon fiber reinforced plastic, and glass fiber reinforced plastic. In addition, these outer face sheets may be single layer or multi-layered structures. The cores of these composite materials are generally designed to be lightweight, yet provide structural integrity to the composite material. Due to the inherent structural characteristics of these core areas, air is inevitably trapped within them between the face sheets during fabrication of these composite materials and/or during a subsequent apparatus construction process (e.g., integrating the composite material into an aircraft, spacecraft, or watercraft).

Air trapped within the core areas of these composite materials tends to be problematic (amongst other instances) when utilizing these composite materials as components of an aircraft and/or spacecraft. More specifically, the pressure differential of the air trapped between the face sheets of the composite material and the air outside the composite tends to increase with elevation. This phenomenon, also referred to as "ascent induced pressure decay", increases the risk of face sheet delamination due to pressure induced bond line failures. In other words, since air pressure inside the composite material may be greater than the air pressure outside the composite material (generally a function of distance from the Earth's surface), the outer face sheet may be pushed away from the core of the composite material by air pressure buildup, potentially resulting in damage to the composite material (and hence the aircraft/spacecraft).

Some attempts at addressing the problems associated with pressure differences between the core areas of composite materials and the external environment (e.g., the atmosphere) have included installing one or more vents on the interior face sheet of the composite material that faces the inner cavity of the fuselage or payload compartment of the aircraft/spacecraft. These "interior" vents potentially pose serious risks to sensitive payloads due to the presence of contaminants and debris (which are generally byproducts of the trimming and/or drilling steps of the composite material fabrication process) within the core area of the composite material. Other attempts have included the use of vents that are made from stainless steel screens reinforced by aluminum frames. These reinforced stainless steel and aluminum vents are generally affixed to vent holes in composite structures. However, these vents tend to be very expensive, difficult to integrate/install, and are generally uniquely designed for one particular application.

SUMMARY OF THE INVENTION

The present invention is generally directed to a system for venting composite materials. More specifically, the present invention is generally directed to a low cost venting system that is easily integrated directly onto/into face sheets of a wide variety of composite structures. Any appropriate type/configuration of composite structure may benefit from utilizing the venting system of the present invention. One particularly desirable application of the venting system is in the outer shell of a launch vehicle, an aircraft, a spacecraft, a rocket, or any other aerodynamic body that flies or otherwise travels through gaseous medium.

A first aspect of the invention relates to a venting assembly including a venting system and a composite structure (e.g., the composite material or an aircraft or spacecraft). Herein, reference to a "composite structure" or "composite material" generally refers to a structure/material having at least first and second face sheets and a core disposed between the first and second face sheets. These face sheets may each include one or more layers of material (i.e., may be composite structures themselves). The venting system of the first aspect generally includes a mounting assembly and a non-metallic venting medium. The mounting assembly generally enables the venting system to be interconnected with the composite structure at a first location and at least generally fluidly interconnected with a first air hole extending from an outermost extent of the composite structure at least within the core of the composite structure. In other words, the venting system may be associated with one of the face sheets in such a manner that the first air hole is at least substantially, and more preferably entirely, covered by the venting system. Alternatively, the venting system may be attached to an apparatus that is attached to the composite structure in such a manner that the first air hole is at least substantially covered by the apparatus, and that an apparatus hole in the apparatus fluidly interconnects the air hole of the composite structure with the venting system of the first aspect.

The venting medium of the first aspect of the present invention is generally capable of one or both filtering and controlling airflow at least between the core of the composite structure and an exterior environment (e.g., the atmosphere). The venting medium generally includes a perimeter region and an airflow region disposed inwardly of the perimeter region, and is designed in such a manner that the airflow region of the venting medium is generally free from direct contact with any other portion of the venting system. In other words, the airflow region of the venting medium generally does not touch the mounting assembly or any other component of the venting system.

Various refinements exist of the features noted in relation to the subject first aspect of the present invention as well. Further features may also be incorporated in the subject first aspect of the present invention as well. These refinements and additional features may exist individually or in any combination. The airflow region in one embodiment of the venting medium may include a surface area of at least about 45 mm$^2$. This surface area of the airflow region is generally defined by a major surface of the airflow region (i.e., a surface that is generally parallel to a lateral extent of the composite material) minus the cross-sectional areas (taken at the major surface) of corresponding airflow passages disposed therethrough. Some embodiment of the first aspect may include the venting medium having a filter mesh size ranging from about 3 microns up to about 5 microns; however, filter mesh sizes outside this range may be appropriate. The individual airflow passages of the airflow region in the case of the first aspect (and optionally, the perimeter region) of the venting medium may have cross-sectional areas ranging in size from about 7 microns$^2$ up to about 20 microns$^2$. In other words, in the case of the airflow passages being substantially circular, the cross-sectional diameter of the airflow passages may range from about 3 microns up to about 5 microns. In the case of the airflow passages exhibiting a polygonal, elliptical, or irregular (multi-angled and/or multi-radial) configuration, at least one cross-sectional length extending between two different points along the configuration may fall within the previously stated range of 3 microns up to about 5 microns. In some embodiments of this first aspect, it may be appropriate to utilize a venting medium having airflow passages outside the above-disclosed range.

The venting medium of one embodiment of this first aspect may generally exhibit an outgassing characteristic quantified by a maximum Total Mass Loss (TML) of no more than about 1%. In other words, an amount of material, which makes up venting medium, that may be lost when exposed to an outer space environment may be no more than about 1%. In another embodiment, the venting medium of this first aspect may generally exhibit an outgassing characteristic quantified by Collected Volatile Condensable Material (CVCM) of no more than about 0.1%. In other words, an amount of material, which makes up the venting medium, that may be lost when the venting medium is exposed to a vacuum environment may be no more than about 0.1%. In any event, these outgassing characteristics generally comply with ASTM (American Society for Testing and Materials) E595 standards.

In one embodiment of the first aspect, the venting medium may be made up of a fluorocarbon polymer or copolymer. In another embodiment, the venting medium may be made up of a fluoroethylene polymer or copolymer. In yet another embodiment, the venting medium may be made of polytetrafluoroethylene, tetrafluoroethylene-hexa-fluoropropylene copolymer, and combinations thereof The venting medium may exhibit one or more physical properties/ characteristics, such as a warp tensile strength of at least about 200 lbs./in., a fill tensile strength of at least about 175 lbs./in., or both. Herein, "warp tensile strength" generally refers to the amount of force per unit length the primary threads/fibers of the venting medium can withstand without significant damage. Similarly, "fill tensile strength" generally refers to the amount of force per unit length the secondary threads/fibers (i.e., those fibers/threads that are oriented generally transversely to the primary threads/fibers) of the venting medium can withstand without significant damage (e.g., breaking). One embodiment of the venting medium may have a thickness ranging from about 5 mils up to about 10 mils. Another embodiment of the venting medium may have a thickness of about 1.5 mils plus a thickness of a fabric to which it is attached/bonded. However, one or more embodiments of the first aspect may have a thickness outside the above-disclosed thickness ranges, as an appropriate thickness of the venting medium may be dependent upon a variety of factors including, but not limited to, the tensile strength and/or the modulus of elasticity of the material utilized to make up the venting medium, the surface area of the airflow region of the venting medium, and the density of the airflow apertures associated with the venting medium. In one embodiment, the venting medium may be sufficient in strength to withstand a pressure of up to about 30 pounds per square inch. In another embodiment, the venting medium may be sufficient in strength (i.e., have one or both a sufficient warp tensile strength and a sufficient fill tensile strength) to withstand a pressure of at least 14.5 pounds per square inch. The mounting assembly in the case of the first aspect of the present invention may have a variety of appropriate configurations, but is preferably cylindrical in shape. In one embodiment, the mounting assembly may have male threads at least on an outer surface thereof for engaging female threads associated with the first face sheet or an apparatus attached thereto. In other words, the mounting assembly may be screwed into an affixed engagement with the first face sheet of the composite structure. Besides the use of threadings, the mounting assembly may be attached to the composite structure utilizing any appropriate manner of attachment such as, but not limited to, welds, adhesives, screws, pins, bolts, and combinations thereof. In one embodiment, the venting medium may be attached to this mounting assembly only at the perimeter region of the venting medium. In other words, the mounting assembly may avoid direct contact with the airflow region of the venting medium. Stated another way, the interface between the venting medium and the mounting assembly may be limited to a perimeter region of the venting medium.

In one embodiment of the first aspect, a retention assembly may be utilized for fastening the venting medium to the mounting assembly. This retention assembly may have a first inner diameter and the mounting assembly may have a second inner diameter. The first inner diameter of the retention assembly may be substantially equal to the second inner diameter of the mounting assembly. An outermost extent of the airflow region of the venting medium may be substantially aligned with at least one of a first inner extent of the retention assembly and a second inner extent of the mounting assembly. Take for example the case where the mounting assembly is a cylinder having a first annular opening extending therethrough, and the retention assembly is a cylinder having a second annular opening extending therethrough. An outermost extent of the airflow region of the venting medium may be substantially aligned with the circumference(s) of one or both the first and second annular openings. The venting medium may be attached to the retention assembly only at the perimeter region of the venting medium. In other words, the retention assembly may avoid direct contact with the airflow region of the venting medium. The perimeter region of the venting medium may be positioned between (i.e., "sandwiched" by) the mounting assembly and the retention assembly. Adhesive may be disposed between the mounting assembly and the perimeter region of the venting medium to adhere the mounting assembly to the perimeter region of the venting medium. Similarly, adhesive may be applied between the retention assembly and the perimeter region of the venting medium to adhere the retention assembly to the perimeter region of the venting medium. Appropriate adhesives for adhering the venting medium to one or both the retention and mounting assemblies may include, but are not limited to, epoxy, acrylic, urethane, and hot melt adhesives.

One or both the mounting assembly and the retention assembly of the first aspect may be made up of metal such as, but not limited to, stainless steel, titanium, aluminum, and alloys and combinations thereof. By contrast, in another embodiment one or both the mounting assembly and the retention assembly of the first aspect may be made up of an appropriate thermoplastic or thermosetting plastic. A "thermoplastic", as used herein, may generally refer to a polymer, and in some variations a high polymer (i.e., an organic macromolecule composed of a large number of monomers and generally having a molecular weight of at least about 5000), that softens when exposed to heat and returns to its original condition when cooled. Examples of thermoplastics may include, but are not limited to, polyvinyl chloride, nylons, fluorocarbons, linear polyethylene, polyurethane prepolymer, polystyrene, polypropylene, and cellulosic and acrylic resins. A "thermosetting plastic", as used herein, generally refers to a polymer, and in some variations a high polymer, that solidifies or sets irreversibly when heated usually via a cross-linking reaction of the molecular constituents induced by heat or radiation. In cases where a thermosetting plastic is used, it may be necessary to add "curing agents" such as organic peroxides or sulfur (e.g., in the case of a rubber based thermosetting plastic). For example, linear polyethylene may be cross-linked to a thermosetting material either by radiation or by chemical reaction. Phenolics, alkyds, amino resins, polyesters, epoxides, and silicon are usually considered to be thermosetting, but the term may also apply to materials where additive-induced cross-linking is possible (e.g., natural rubber). Those features discussed herein in relation to one or more of the other aspects of the present invention may be incorporated into this or any other aspect of the present invention as well, and in the manner noted herein.

A second aspect of the invention relates to a venting assembly having a venting system interfacing with a composite material (that may or may not be associated with an aircraft or spacecraft). The venting system of this second aspect substantially provides a controlled fluid interconnection between the interior of the core and the atmosphere. In other words, in this second aspect, for airflow to pass between the exterior environment and the core of the composite material, the airflow must pass through the venting system. The venting system of this second aspect generally includes a mounting assembly for mounting the venting system with respect to an air hole of the composite material. In other words, the venting system may be mounted directly to a face sheet or may be attached to another structure that is attached to the composite material. In any event, the airflow that passes through the first air hole and between the core of the composite material and the exterior enviromnent generally must pass through the venting medium of the venting system of the second aspect. Generally this venting medium of the second aspect is made up of a fluorocarbon polymer or copolymer and optionally, those materials that do not materially affect the physical and/or chemical characteristics/properties of the fluorocarbon polymer/copolymer.

Various refinements exist of the features noted in relation to the subject second aspect of the present invention as well. Further features may also be incorporated in the subject second aspect of the present invention. These refinements and additional features may exist individually or in any combination. In one embodiment, the venting medium may be made up of a fluoroethylene polymer or copolymer. For example, the venting medium may be made up of polytetrafluoroethylene, tetrafluoroethylene-hexa-fluoropropylene copolymer, and/or combinations thereof.

One embodiment of the venting medium of this second aspect may have airflow passages extending entirely therethrough. Stated another way, airflow passing between the exterior environment and the core of the composite material of one variation of the second aspect generally must pass through these airflow passages. One embodiment of the venting medium of the second aspect may have a thickness ranging from about 5 mils up to about 10 mils. Another embodiment of the venting medium of the second aspect may have a thickness of about 1.5 mils plus a thickness of a fabric to which it is attached/bonded. The venting medium of the second aspect may (at least in one embodiment) be sufficient in strength (i.e., warp and/or fill tensile strength) to withstand a pressure of up to about 30 pounds per square inch. In another embodiment, the venting medium of the second aspect may be sufficient in strength to withstand a pressure of at least 14.5 pounds per square inch.

The venting medium, in the case of this second aspect may include a perimeter region and an airflow region disposed inwardly of the perimeter region. In one embodiment, the airflow region of the venting medium is free from direct contact with any other portion of the venting system. The venting medium may be attached to the mounting assembly of the second aspect only at the perimeter region of the venting medium. Various features discussed herein in relation to one or more of the aspects of the present invention may be incorporated into any of the other aspects of the present invention as well, and in the manner noted herein.

DETAILED DESCRIPTION

Figure 1:
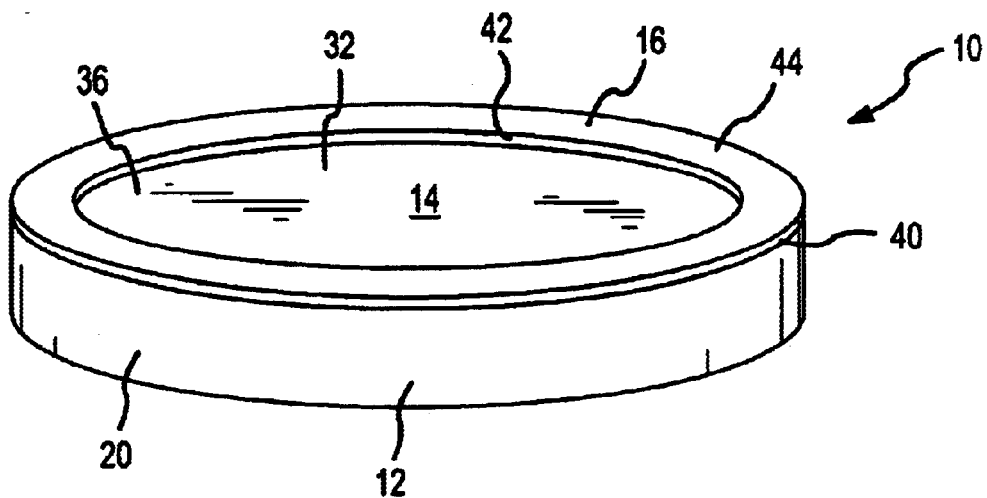
FIG. 1 illustrates a perspective view of one embodiment of a venting system.
Figure 2:
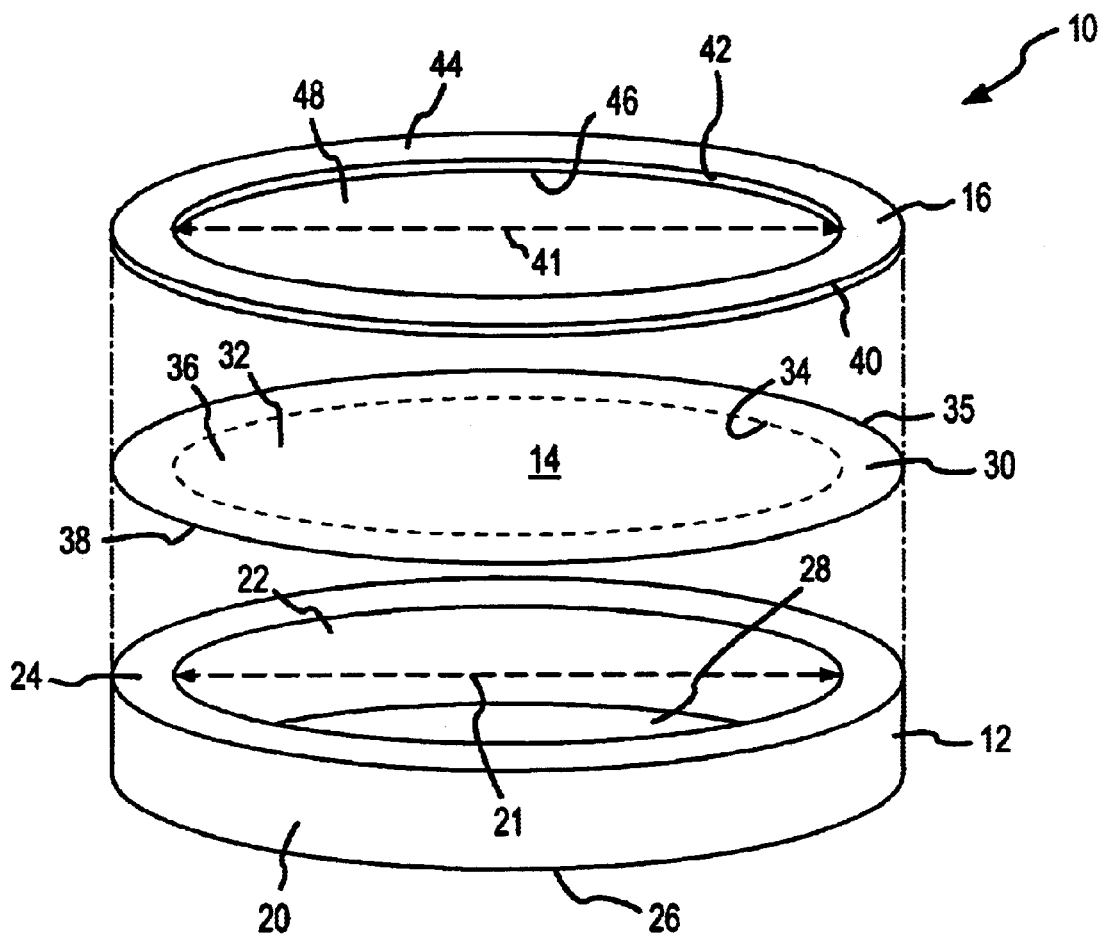
FIG. 2 illustrates an exploded, perspective view of the venting system of FIG. 1.

The present invention will now be described in relation to the accompanying drawings, which at least assist in illustrating its various pertinent features. FIGS. 1–2 illustrate a venting system 10 having a mounting assembly 12, a venting medium 14, and a retention assembly 16. The venting system 10 is substantially round and may be said to exhibit a cylindrical or "ring-shaped" configuration. However, the size, shape, and/or configuration of the venting system 10 are not critical to the invention unless otherwise noted herein.

The mounting assembly 12 of the venting system 10 has an outer surface 20 and an inner surface 22. These outer and inner surfaces 20, 22 are illustrated as being at least substantially annular. In addition, the mounting assembly 12 includes an upper surface 24 and a lower surface 26. The upper surface 24 of the mounting assembly 12 at least generally faces the venting medium 14 of the venting system 10. Conversely, the lower surface 26 of the mounting assembly 12 is at least generally directed away from the venting medium 14 (i.e., faces in a direction opposite that of the upper surface 24). An airflow aperture 28 is generally defined by the inner surface 22 of the mounting assembly 12. As will be discussed below, this airflow aperture 28 at least generally directs airflow exiting an air hole within the composite structure toward the venting medium 14. In addition, and as will also be discussed below, this airflow aperture 28 at least generally directs airflow entering the venting system 10 toward the air hole associated with the corresponding composite structure.

The venting medium 14 generally includes a perimeter region 30 and an airflow region 32 disposed inwardly of the perimeter region 30, and is designed in such a manner that the airflow region 32 of the venting medium 14 is free from direct contact with any other portion of the venting system 10. Stated another way, the airflow region 32 of the venting medium 14 does not touch the mounting assembly 12, the retention assembly 16, or any other component of the venting system 10. This airflow region 32 may have a surface area of at least about 45 mm$_2$.

From a fabrication standpoint, the venting medium 14 may be made up of a fluorocarbon polymer or copolymer. In another embodiment, the venting medium 14 may be made up of a fluoroethylene polymer or copolymer such as polytetrafluoroethylene, tetrafluoroethylene-hexa-fluoropropylene copolymer, and combinations thereof. Such fluoro-ethylene polymers or copolymers may be those which are more commonly known under the trademark of Teflon® which is manufactured by DuPont of Wilmington, Del.

Figure 3:
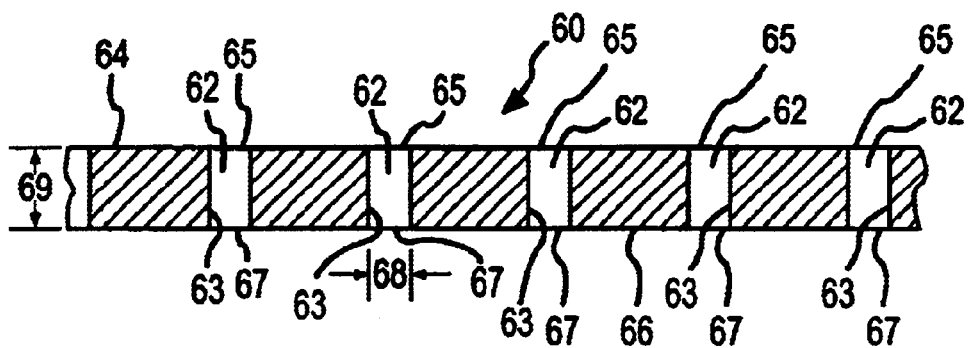
FIG. 3 illustrates a magnified cross-sectional view of one embodiment of a venting medium that may be utilized by the venting system of FIGS. 1–2.

FIG. 3 illustrates a venting medium 60 that may be utilized as the venting medium 14 in the venting system 10 of FIGS. 1–2 and in other embodiments disclosed herein. Airflow passages 62 of the venting medium 60 generally extend through an entirety of the venting medium 60. That is, the airflow passages 62 generally span from a top surface 64 of the venting medium 60 to a bottom surface 66 of the venting medium 60. These airflow passages 62 may have a cross-sectional area ranging in size from about 7 microns up to about 20 microns. In the case of the airflow passages 62 being substantially cylindrical, the passage width 68 of each respective airflow passage 68 may be synonymous with a cross-sectional diameter of each such airflow passage 68 in the case of the airflow passages 62 exhibiting a polygonal, elliptical, or irregular (multi-angled and/or multi-radial) configuration, the passage width 68 may be synonymous with a cross-sectional length of a respective airflow passages 62 (i.e., extending between two different points along a corresponding passage wall 63), wherein this cross-sectional length is substantially parallel to one or both the top and bottom surfaces 64, 66 of the venting medium 60. While each of the airflow passages 62 of the venting medium 60 are illustrated as having a top opening 65 substantially equal in size to a bottom opening 67, other variational embodiments may exhibit top openings that are not substantially equal in size to the corresponding bottom opening. One such variational embodiment may have airflow passages exhibiting frustoconical (i.e., tapered) configurations. Generally, the configuration of the individual airflow passages 62 is not of particular importance, so long as the desired airflow through the venting medium 60 may be realized.

Referring to various properties/characteristics of the embodiment of FIG. 3, the venting medium 60 may have a thickness 69 ranging from about 5 microns up to about 10 microns. The venting medium 60 may exhibit a warp tensile strength of at least about 200 lbs./in. and/or a fill tensile strength of at least about 175 lbs./in. In one embodiment, the venting medium 60 is sufficient in strength to withstand a pressure of up to about 30 pounds per square inch. In another embodiment, the venting medium 60 is sufficient in strength to withstand a pressure of at least 14.5 pounds per square inch. Since the various physical and/or chemical properties/characteristics of the venting medium 60 may generally interdepend on other physical and/or chemical properties/characteristics of the venting medium 60, a change in one or more of the thickness, tensile strength, modulus of elasticity, surface area of the airflow region, and density of the airflow passages associated with the airflow region may require an appropriate change in one or more of the other above-listed factors.

Referring back to FIGS. 1–2, the retention assembly 16 at least generally assists in maintaining the position of the venting medium 14 with respect to the mounting assembly 12 of the venting system 10. The retention assembly 16 generally includes an outer surface 40 and an inner surface 42, both of which are illustrated as being substantially annular. In addition, the retention assembly 16 includes an upper surface 44 and a lower surface 46. The lower surface 46 of the retention assembly 16 at least generally faces the venting medium 14 of the venting system 10. Conversely, the upper surface 44 of the retention assembly 16 is at least generally directed away from the venting medium 14 (i.e., faces a direction opposite that of the lower surface 46). An airflow aperture 48 of the retention assembly 16 is at least generally defined by the inner surface 42 of the retention assembly 16.

The retention assembly 16 illustrated in FIGS. 1–2 has an inner diameter 41 that generally refers to a distance between substantially coplanar, opposite points on the inner surface 42 of the retention assembly 16. Similarly, the mounting assembly 12 also has an inner diameter 21 generally defined by a distance between substantially coplanar, opposite points on the inner surface 22 of the mounting assembly 12. As FIG. 2 illustrates, the inner diameter 41 of the retention assembly 16 may be substantially equal to the inner diameter 21 of the mounting assembly 12. It may be said then that the airflow aperture 48 of the retention assembly 16 may have a size substantially equal to a size of the airflow aperture 28 of the mounting assembly 12, when measured in respective planes that are oriented substantially parallel to the venting medium 14. In any event, an outermost extent 34 of the airflow region 32 of the venting medium 14 may be substantially aligned with at least one of the inner surface 42 of the retention assembly 16 and the inner surface 22 of the mounting assembly 12. In the case of the embodiment illustrated in FIGS. 1–2, the outermost extent 34 of the airflow region 32 of the venting medium 14 is substantially aligned with both inner surfaces 22, 42 of the respective assemblies 12, 16.

The venting medium 14 may be attached to one or both the mounting assembly 12 and the retention assembly 16 only at the perimeter region 30 of the venting medium 14. In other words, both the mounting and retention assemblies 12, 16 generally avoid direct contact with the airflow region 32 of the venting medium 14. Accordingly, the perimeter region 30 of the venting medium 14 is positioned between (i.e., "sandwiched" by) the upper surface 24 of the mounting assembly 12 and the lower surface 46 of the retention assembly 16. While an outermost extent 35 of the perimeter region 30 of the venting medium 14 is illustrated as extending out only to about the outer surfaces 20, 40 of the respective mounting and retention assemblies 12, 16, some variational embodiments may exhibit the outermost extent 35 of the perimeter region 30 of the venting medium 14 extending out at least beyond the inner surfaces 22, 42 but not to the corresponding outer surfaces 20, 40 of the respective mounting and retention assemblies 12, 16. In other words, the perimeter region 30 of the venting medium 14 of such variational embodiments may not be the same size as one or both the upper surface 24 of the mounting assembly 12 and the lower surface 46 of the retention assembly 16. Although such may not be preferred, other variational embodiments are contemplated in which the outermost extent 35 of the perimeter region 30 extends beyond one or both the outer surfaces 20, 40 of the respective mounting and retention assemblies 12, 16. In any event, one or both of these mounting and retention assemblies 12, 16 may be made up of an appropriate material(s) such as metal (e.g., stainless steel, titanium, aluminum, and alloys and combinations thereof), thermoplastic and/or thermosetting plastic.

Adhesive (not shown) may be placed on one or both of the upper surface 24 of the mounting assembly 12 and the perimeter region 30 of the venting medium 14 to adhere the mounting assembly 14 to the perimeter region 30 of the venting medium 14. Similarly, adhesive (not shown) may be applied to one or both of the lower surface 46 of the retention assembly 16 and the perimeter region 30 the venting medium 14 to adhere the retention assembly 16 to the perimeter region 30 of the venting medium 14. Ideally, the adhesive extends through the entireties of the airflow passages 62 (FIG. 3) found in the perimeter region 30 of the venting medium 14 to enable the mounting assembly 12 to be adhesively interconnected with the retention assembly 16. Appropriate adhesives for adhering the perimeter region 30 of the venting medium 14 to one or both of the retention and mounting assemblies 16, 12, respectively, may include, but are not limited to, epoxy, acrylic, urethane, and hot melt adhesives. One such appropriate adhesive may be Hysol® EA93/94 manufactured by Loctite® Corporation of Rocky Hill, Conn.

Figure 4A:
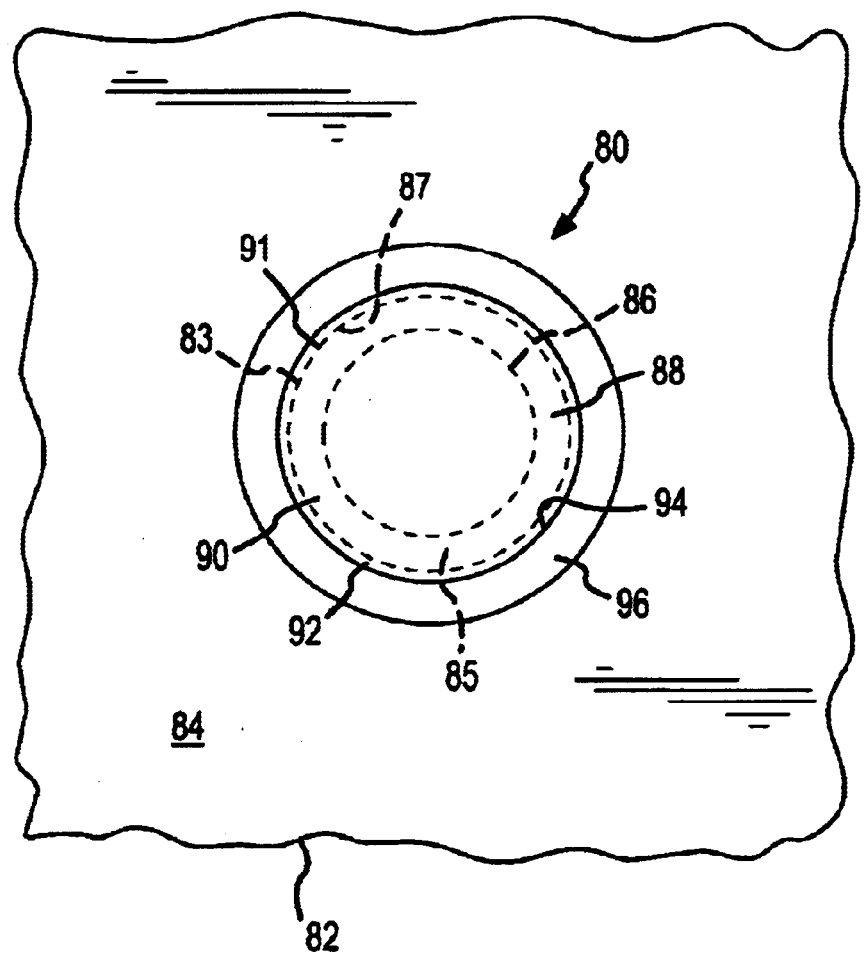
FIG. 4A illustrates a top view of another embodiment of a venting system installed on a composite structure.

FIG. 4A shows a top view of a venting system 80 attached to a composite structure 82. Components of the venting system 80 that correspond with those of the venting system 10 discussed above are similarly identified, and only the structural and/or functional differences will be described herein. The venting system 80 is generally positioned on and affixed to an outer face sheet 84 of the composite structure 82 in a manner such that the lower surface (e.g., 26) of the mounting assembly 83 may interface with the outer face sheet 84 of the composite structure 82. In other words, the venting system 80 is generally positioned atop an air hole 86 in the composite structure 82 in such a manner that the lower surface (e.g., 26) of the mounting assembly 83 substantially avoids overlying any significant portion of the air hole 86. By making sure that airflow which enters/exits the air hole 86 generally has to pass through a venting medium 88 of the venting system 80, the potential for contaminants/debris entering/exiting the composite structure 82 is reduced. Accordingly, the venting medium 88 of this venting system 80 is generally capable of one or both filtering and controlling airflow at least between a core (not shown) of the composite structure 82 and an exterior environment (e.g., the payload compartment and/or inner cavity of the fuselage).

The venting system 80 shown in FIG. 4A differs from the venting system 10 of FIGS. 1–2 in that an airflow aperture 85 defined by an inner surface 87 of the mounting assembly 83 is smaller than an airflow aperture 92 defined by an inner surface 94 of a retention assembly 96. Accordingly, an outermost extent 91 of the airflow region 90 of the venting medium 88 may be defined by the inner surface 87 of the mounting assembly 83. In addition, one should note that the air hole 86 is smaller than the airflow region 90 of the venting system 80. Yet, some variational embodiments may exist wherein the air hole 86 in the composite structure 82 is substantially the same size as, and even in some instances, slightly greater than the size of the airflow region 90 of the venting system 80. However, in the event that at least a portion of the air hole 86 in the composite structure 82 extends beyond the area of the composite structure 82 covered by the venting system 80, it may be recommended that a larger (i.e., covering a greater surface area of the composite structure 82) venting system be utilized.

Figure 4B:
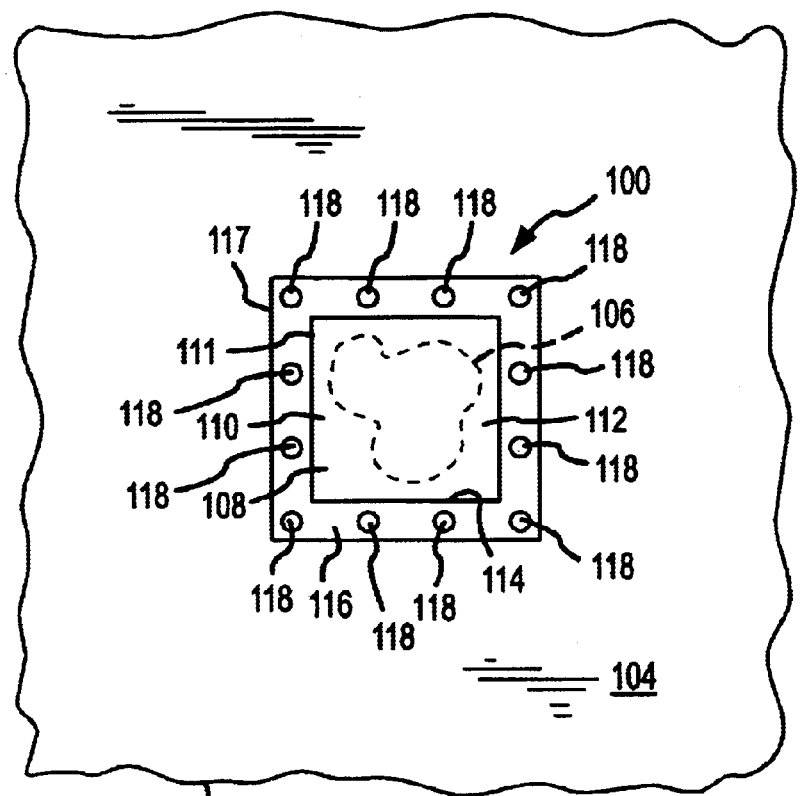
FIG. 4B illustrates a top view of another embodiment of a venting system installed on a composite structure.

FIG. 4B shows a top view of a venting system 100 attached to a composite structure 102. Components of the venting system 80 that correspond with those of the venting system 10 discussed above are similarly identified, and only the structural and/or functional differences will be described herein. The venting system 100 is generally positioned on and affixed to an outer face sheet 104 of the composite structure 102 in a manner such that the lower surface (e.g., 26) of the mounting assembly (e.g., 12) may interface with the outer face sheet 104 of the composite structure 102. In other words, the venting system 100 is generally positioned atop an air hole 106 in the composite structure 102 in such a manner that the lower surface (e.g., 26) of the mounting assembly (e.g., 12) substantially avoids overlying any significant portion of the air hole 106. By making sure that airflow which enters/exits the air hole 106 has to pass through a venting medium 108 of the venting system 100, the potential for contaminants/debris entering/exiting the composite structure 102 is reduced.

The venting system 100 shown in FIG. 4B differs from the venting system 80 of FIG. 4A in that the venting system 100 is a polygon (more specifically a quadrilateral, and even more specifically a square). In addition (and like the venting system 10 of FIGS. 1–2) an airflow aperture (e.g., 28) defined by an inner surface (e.g., 22) of the mounting assembly (e.g., 12) is substantially the same size as an airflow aperture 112 defined by an inner surface 114 of a retention assembly 116. Accordingly, an outermost extent 111 of the airflow region 110 of the venting medium 108 may be defined by the inner surface 114 of the retention assembly 116. In addition, one should note that the air hole 106 has an irregular configuration rather than being configured to exhibit substantially the same shape as the airflow region 110 and/or the venting system 100. In most embodiments of the venting system 100, the shape of the air hole 106 is generally irrelevant to the function of the venting system 100. Further (and as with the venting system 80 of FIG. 4A), the air hole 106 is smaller than the airflow region 110 of the venting system 100. However, some variational embodiments may exist wherein at least a portion of the air hole 106 in the composite structure 102 extends to, and even in some instances extends slightly beyond, the airflow region 110 of the venting system 100. Nonetheless, generally no portion of the air hole 106 extends beyond the outermost extent 117 of the venting system 100.

Yet another point of distinction between the venting system 100 of FIG. 4B and the venting system 80 of FIG. 4A is that the venting system 100 includes a plurality of fasteners 118. In one embodiment, these fasteners 118 are used to interconnect the retention assembly 116 with the underlying mounting assembly (not shown) of the venting system 100. In another embodiment, these fasteners 118 extend through both the retention assembly 116 and the mounting assembly (not shown) and fixedly engage the composite structure 102 (or at least the outer face sheet 104) to not only interconnect the retention assembly 116 and the mounting assembly (not shown) but also to attach the venting system 100 to the composite structure 102. Depending on the size and configuration of a perimeter region (e.g., 30 of FIG. 2) of the venting medium 108, these fasteners 118 may or may not pass through the perimeter region of the venting medium 108 in interconnecting the mounting assembly with the retention assembly 116. Examples of appropriate fasteners that may be utilized as the fasteners 118 include, but are not limited to, screws, pins, bolts, and combinations thereof.

Figure 5A:
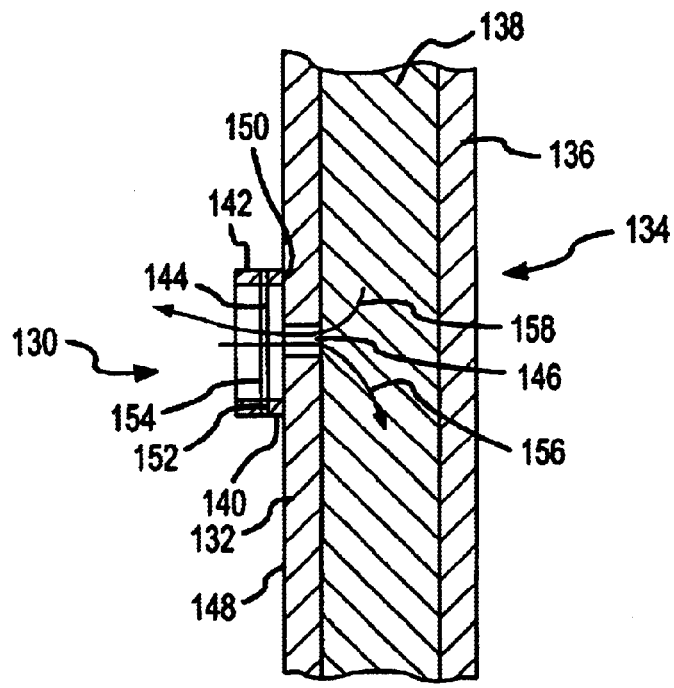
FIG. 5A illustrates a cross-sectional view of another embodiment of a venting system installed on a composite structure.

FIG. 5A shows a venting system 130 attached to an outer face sheet 132 of a composite structure 134. Components of the venting system 80 that correspond with those of the venting system 10 discussed above are similarly identified, and only the structural and/or functional differences will be described herein. Besides the outer face sheet 132, the composite structure 134 generally includes an inner face sheet 136 and a core 138 positioned between the outer and inner face sheets 132, 136. One or both of these face sheets 132, 136 may be made up of one or more layers of material (i.e., may be composite structures themselves). In addition, the core 138 may be made of any appropriate material such as, but not limited to, metallic or non-metallic honeycomb, structural foams, and/or wood fibers (e.g. balsa).

The venting system 130 of FIG. 5A includes a mounting assembly 140, a retention assembly 142, and a non-metallic venting medium 144. The mounting assembly 140 generally enables the venting system 130 to be fluidly interconnected with an air hole 146 of the composite structure 134 that generally extends from an outermost extent 148 of the outer face sheet 132 of the composite structure 134 at least to the core 138 of the composite structure 134. That is, the venting system 130 is attached to the outer face sheet 132 in such a manner that the air hole 146 is substantially covered by the venting system 130.

The venting system 130 of FIG. 5A is attached to the outer face sheet 132 of the composite structure 134 by use of one or more of welding, adhesive, and mechanical fasteners (not shown) to attach the lower surface 150 of the mounting assembly 140 to the outermost extent 148 of the outer face sheet 132. In addition, a perimeter region 152 is held (e.g., by use of adhesive) between the retention assembly 142 and the mounting assembly 140 to maintain a positioning of the venting medium 144 with respect to the mounting assembly 140 and the retention assembly 142. During use then, airflow is enabled to enter/exit the core 138 via the air hole 146 and an airflow region 154 of the venting medium 144 at least generally (but not exclusively) in the directions indicated by arrows 156, 158.

Figure 5B:
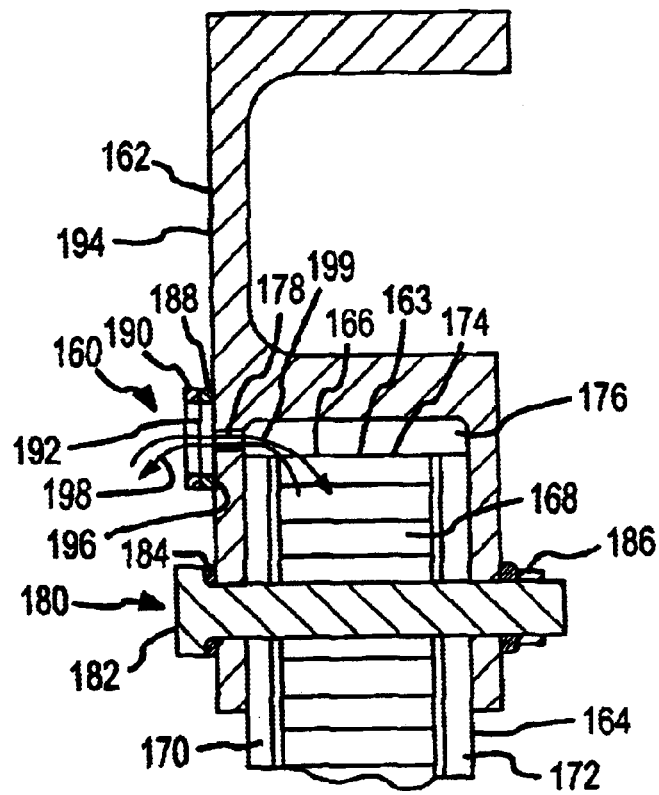
FIG. 5B illustrates a cross-sectional view of another embodiment of a venting system installed on a structure that is attached to a composite structure.

FIG. 5B shows a venting system 160 attached to an apparatus (in this case, a composite structural interface ring) 162 that is attached to an end 163 of a composite structure 164 by an appropriate attachment means (in this case, a bolt 182, washer 184, and nut 186) 180. Components of the venting system 80 that correspond with those of the venting system 10 discussed above are similarly identified, and only the structural and/or functional differences will be described herein. The composite structure 164 generally includes first and second face sheets 170, 172, respectively, and a core 168 position between the first and second may sheets 170, 172. Prior to attaching the apparatus 162 to an end 163 of the composite structure 164, the end 163 exhibited an exposed (i.e., not covered by a face sheet) portion 166 of the core 168 of the composite structure 164. Thus, an air hole 174 of this embodiment is generally defined by the exposed portion 166 of the core 168 of the composite structure 164. Subsequent to attaching the apparatus 162 to the end 163 of the composite structure 164, an open area 176 is generally defined by a space between the end 163 of the composite structure 164 and the attached apparatus 162. In other words, the air hole 174 is substantially covered (i.e., sealed off or isolated) by the apparatus 162 except for an apparatus hole 178 in the apparatus 162 that fluidly interconnects the air hole (i.e., the exposed portion 166 of the core 168) 174 of the composite structure 164 with the venting system 160.

The venting system 160 of Figure 5B generally includes a mounting assembly 188, a retention assembly 190, and a non-metallic venting medium 192. This venting system 160 is attached to an outer surface 194 of the apparatus 162 by use of at least one of welds, adhesive(s), and mechanical fasteners to attach a lower surface 196 of the mounting assembly 188 to the outer surface 194 of the apparatus 162. During use then, airflow is enabled to enter/exit the core 168 via the air hole 174, the open area 176, the apparatus hole 178, and the venting medium 192 at least generally (but not exclusively) in the directions indicated by arrows 198, 199.

Figure 5C:
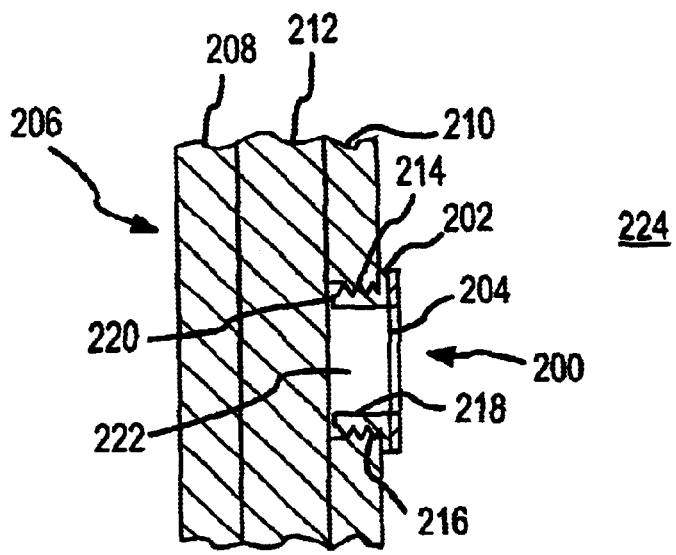
FIG. 5C illustrates a cross-sectional view of yet another embodiment of a venting system installed on a composite structure.

Figure 5C shows a venting system 200 attached to a composite structure 206 having first and second face sheets 208, 210, respectively, and a core 212 positioned between the first and second face sheets 208, 210. Components of the venting system 80 that correspond with those of the venting system 10 discussed above are similarly identified, and only the structural and/or functional differences will be described herein. The venting system 200 generally includes a mounting assembly 202 and a venting medium 204 attached thereto. An outer surface 214 of the mounting assembly 202 of the venting system 200 includes male threads 216 for engaging complementary female threads 218 associated with the second face sheet 210. These female threads 218 are generally positioned along a wall 220 that defines an air hole 222 extending between an exterior environment 224 and the core 212 of the composite material 206. Thus, the venting system 200 may be easily attached to the composite structure simply by screwing/turning the venting system 200 into an affixed engagement with the wall 220 that defines the air hole 222 in the second face sheet 210 of the composite structure 206.

Those skilled in the art will now see that certain modifications can be made to the system herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed:

1. A venting assembly comprising a venting system and a composite structure, wherein said composite structure comprises first and second face sheets, a core disposed between said first and second face sheets, and a first air hole extending from an outermost extent of said composite structure to said core of said composite structure, wherein said venting system comprises:

a mounting assembly for interconnecting said venting system with said composite structure at a first location at least generally fluidly interconnected with said first air hole; and a non-metallic venting medium for one or both filtering and controlling airflow at least between said core of said composite structure and an exterior environment, wherein said venting medium comprises a perimeter region and an airflow region disposed inwardly of said perimeter region, and wherein said airflow region of said venting medium is free from direct contact with any other portion of said venting system.

2. A venting assembly, as claimed in claim 1, wherein said venting medium is attached to said mounting assembly only at said perimeter region of said venting medium.

3. A venting assembly, as claimed in claim 1, wherein said airflow region of said venting medium comprises a surface area of at least about 45 mm$_2$.

4. A venting assembly, as claimed in claim 1, wherein at least said airflow region of said venting medium comprises airflow passages ranging in cross-sectional area from 7 microns$^2$ up to 20 microns$^2$.

5. A venting assembly, as claimed in claim 1, wherein said venting medium is made of a fluorocarbon polymer or copolymer.

6. A venting assembly, as claimed in claim 1, wherein said venting medium is made of a fluoroethylene polymer or copolymer.

7. A venting assembly, as claimed in claim 1, wherein said venting medium is made of a material selected from the group consisting of polytetrafluoroethylene, tetrafluoroethylene-hexa-fluoro-propylene copolymer, and combinations thereof.

8. A venting assembly, as claimed in claim 1, wherein said venting medium comprises a warp tensile strength of at least about 200 lbs./in., wherein said warp tensile strength refers to an amount of force per unit length primary fibers of said venting medium can withstand without significant damage.

9. A venting assembly, as claimed in claim 1, wherein said venting medium comprises a fill tensile strength of at least about 175 lbs./in., wherein said fill tensile strength refers to an amount of force per unit length secondary fibers of said venting medium can withstand without significant damage.

10. A venting assembly, as claimed in claim 1, wherein said venting medium is sufficient in strength to withstand a pressure of up to about 30 pounds per square inch.

11. A venting assembly, as claimed in claim 1, wherein said venting medium is sufficient in strength to withstand a pressure of at least 14.5 pounds per square inch.

12. A venting assembly, as claimed in claim 1, wherein said venting medium comprises a thickness ranging from 5 mils up to 10 mils.

13. A venting assembly, as claimed in claim 1, wherein said mounting assembly is made up of metal, a thermoplastic, or a thermosetting plastic.

14. A venting assembly, as claimed in claim 13, wherein said metal is selected from the group consisting of stainless steel, titanium, aluminum, and alloys and combinations thereof.

15. A venting assembly, as claimed in claim 1, wherein said mounting assembly is cylindrical.

16. A venting assembly, as claimed in claim 1, wherein said mounting assembly comprises male threads at least on an outer surface thereof for engaging female threads of said first face sheet.

17. A venting assembly, as claimed in claim 1, wherein said mounting assembly is attached to said composite structure utilizing an attachment means selected from the group consisting of threadings, welds, adhesives, screws, pins, bolts, and combinations thereof.

18. A venting assembly, as claimed in claim 1, further comprising a retention assembly for fastening said venting medium to said mounting assembly.

19. A venting assembly, as claimed in claim 18, wherein said retention assembly comprises a first inner diameter and said mounting assembly comprises a second inner diameter, wherein said first inner diameter is substantially equal to said second inner diameter.

20. A venting assembly, as claimed in claim 18, wherein a periphery of said airflow region of said venting medium is substantially aligned with at least one of a first inner extent of said retention assembly and a second inner extent of said mounting assembly.

21. A venting assembly, as claimed in claim 18, wherein said venting medium is attached to said retention assembly only at said perimeter region of said venting medium.

22. A venting assembly, as claimed in claim 18, wherein said perimeter region of said venting medium is disposed between said mounting assembly and said retention assembly.

23. A venting assembly, as claimed in claim 22, wherein adhesive is disposed between said mounting assembly and said perimeter region of said venting medium, wherein said adhesive is also disposed between said retention assembly and said perimeter region of said venting medium.

24. A venting assembly, as claimed in claim 23, wherein said adhesive comprises an epoxy, acrylic, urethane, or hot melt adhesive.

25. A venting assembly, as claimed in claim 1, wherein said composite structure comprises an aircraft or spacecraft.

26. A venting assembly comprising a venting system and a composite material, wherein said composite material comprises first and second face sheets, a core disposed between said first and second face sheets, and a first air hole enabling airflow between said core of said composite material and an exterior environment, wherein said venting assembly comprises:
  a mounting assembly for mounting said venting assembly with respect to said first air hole; and
  a venting medium consisting essentially of a fluorocarbon polymer or copolymer, wherein said airflow through said first air hole and between said core of said composite material and said exterior environment passes through said venting medium of said venting system.

27. A venting assembly, as claimed in claim 26, wherein said venting medium comprises a fluoroethylene polymer or copolymer.

28. A venting assembly, as claimed in claim 26, wherein said venting medium is selected from the group consisting of polytetrafluoroethylene, tetrafluoroethylene-hexa-fluoro-propylene copolymer, and combinations thereof.

29. A venting assembly, as claimed in claim 26, wherein said venting medium comprises airflow passages extending entirely therethrough.

30. A venting assembly, as claimed in claim 26, wherein said venting medium comprises a warp tensile strength of at least about 200 lbs./in., wherein said warp tensile strength refers to an amount of force per unit length primary fibers of said venting medium can withstand without significant damage.

31. A venting assembly, as claimed in claim 26, wherein said venting medium comprises a fill tensile strength of at least about 175 lbs./in., wherein said fill tensile strength refers to an amount of force per unit length secondary fibers of said venting medium can withstand without significant damage.

32. A venting assembly, as claimed in claim 26, wherein said venting medium is sufficient in strength to withstand a pressure of up to about 30 pounds per square inch.

33. A venting assembly, as claimed in claim 26, wherein said venting medium is sufficient in strength to withstand a pressure of at least 14.5 pounds per square inch.

34. A venting assembly, as claimed in claim 26, wherein said venting medium comprises a perimeter region and an airflow region disposed inwardly of said perimeter region.

35. A venting assembly, as claimed in Claimed 34, said airflow region of said venting medium is free from direct contact with any other portion of said venting system.

36. A venting assembly, as claimed in claim 34, wherein said venting medium is attached to said mounting assembly only at said perimeter region of said venting medium.

37. A venting assembly, as claimed in claim 26, wherein said mounting assembly is attached to said composite material utilizing an attachment means selected from the group consisting of threadings, welds, adhesives, screws, pins, bolts, and combinations thereof .

38. A venting assembly, as claimed in claim 26, wherein said composite material is a component of an aircraft or spacecraft.

* * * * *

UNITED STATES PATENT AND TRADEMARK OFFICE
CERTIFICATE OF CORRECTION

PATENT NO.    : 6,758,743 B1
DATED         : June 6, 2004
INVENTOR(S)   : Grosskrueger It is certified that error appears in the above-identified patent and that said Letters Patent is hereby corrected as shown below:

Column 5,
Line 41, delete the word "enviromnet", and insert therefor -- environment --.

Column 13,
Line 9, delete the word "$mm_2$", and insert therefor -- $mm^2$ --.

Signed and Sealed this

Seventeenth Day of August, 2004

JON W. DUDAS
*Acting Director of the United States Patent and Trademark Office*